United States Patent [19]

Crass et al.

[11] Patent Number: 5,229,140
[45] Date of Patent: Jul. 20, 1993

[54] DEVICE FOR SMOOTHING OUT THE THICKNESS OF A SHEET

[75] Inventors: Guenther Crass, Taunusstein; Siegfried Janocha, Wiesbaden; Harald Mueller, Hofheim, all of Fed. Rep. of Germany

[73] Assignee: Hoechst Aktiengesellschaft, Frankfurt am Main, Fed. Rep. of Germany

[21] Appl. No.: 857,185

[22] Filed: Mar. 25, 1992

[30] Foreign Application Priority Data

Mar. 27, 1991 [DE] Fed. Rep. of Germany ....... 4110060

[51] Int. Cl.$^5$ .................. B29C 47/14; B29C 47/86
[52] U.S. Cl. .................................. 425/141; 264/40.6;
264/DIG. 46; 364/473; 425/143; 425/162;
425/378.1; 425/DIG. 13
[58] Field of Search ............... 264/40.6, 40.1, 40.4,
264/DIG. 46; 425/141, 143, 144, 461, 162,
378.1, DIG. 13; 364/473

[56] References Cited

U.S. PATENT DOCUMENTS

| | | | |
|---|---|---|---|
| 3,761,553 | 9/1973 | Richardson | 425/141 |
| 3,767,346 | 10/1973 | Mihalik | 425/461 |
| 4,426,239 | 1/1984 | Upmeier | 425/141 |
| 4,514,348 | 4/1985 | Iguchi et al. | 264/40.1 |
| 4,594,063 | 6/1986 | Reifenhauser et al. | 264/40.1 |
| 5,020,984 | 6/1991 | Cloeren et al. | 425/143 |

FOREIGN PATENT DOCUMENTS

| | | |
|---|---|---|
| 330603A3 | 8/1989 | European Pat. Off. . |
| 0367022 | 5/1990 | European Pat. Off. . |
| 3006566C2 | 8/1981 | Fed. Rep. of Germany . |
| 3107701 | 1/1982 | Fed. Rep. of Germany . |
| 3740087C2 | 7/1989 | Fed. Rep. of Germany . |
| 3834719 | 4/1990 | Fed. Rep. of Germany . |
| 3834719A1 | 4/1990 | Fed. Rep. of Germany . |
| 63-183826 | 7/1988 | Japan ..................... 425/141 |
| 2226660 | 7/1990 | United Kingdom . |

OTHER PUBLICATIONS

Patent Abstracts of Japan, vol. 12, No. 222 (M-712) (3069), Jun. 24, 1988, and Japanese Patent No. JP-A-63 019 220, published Jan. 27, 1988.

*Primary Examiner*—Jeffery Thurlow
*Assistant Examiner*—Mathieu Vargot
*Attorney, Agent, or Firm*—Foley & Lardner

[57] ABSTRACT

A device for smoothing out the thickness of a sheet of thermoplastic material which includes a sheet die and a heating device which is integrated with the upper die lip of the sheet die. The heating device includes a hollow box filled with a liquid and a bar which projects laterally beyond the endfaces of the hollow box. The inlet and outlet openings of the bar in the hollow box are sealed. Arranged on the underside of the bar are small hot plates which are electrically heated. The liquid in the hollow box serves as a heat transfer medium and typically is an oil having a boiling point higher than 280° C. The thickness profile of the extruded sheet is controlled, on the one hand, via controlling elements and, on the other hand, remaining thick and/or thin points of the sheet profile are smoothed by the bar of the heating device, in which the bar is progressively moved transversely with respect to the running direction of the sheet across the sheet width with the aid of a motor into a position in which the small hot plates are aligned with the thick/thin points to be smoothed. The corresponding thick/thin points of the sheet are smoothed by exposing the small hot plates to different temperatures or heating powers.

7 Claims, 4 Drawing Sheets

DEVICE FOR SMOOTHING OUT THE THICKNESS OF A SHEET

BACKGROUND OF THE INVENTION

The invention relates to a method of smoothing out the thickness of a sheet of thermoplastic material which is extruded through a sheet die, in which method the current thickness of the sheet is measured over the sheet width and the measured thickness values are averaged within equally wide sheet sections, and also a device for this purpose.

In the production of two-dimensional plastic structures, such as, for example, sheets or panels, the plastic melt is generally remolded from a circular or oval cross section into an approximately rectangular cross section by a sheet die. In this process, the sheet die delivers a sheet preform profile having a cross section which is not precisely rectangular. The profile of this sheet preform, which is frequently convex, is adjusted by suitable controlling elements at one of the die lips of the sheet die with whose aid the die gap is controlled. The sheet preform delivered by the sheet die is then biaxially-stretched in order to obtain a final sheet having a flat transverse thickness profile. This final sheet is, consequently, a biaxially oriented sheet of plastic, for example polypropylene or polyester, which is molded by longitudinal stretching by means of rolls and transverse stretching in a transverse stretching frame.

During the operation of a sheet or panel extruder, the final sheet profile is subject to certain variations due, on the one hand, to raw material inhomogeneities in the plastic melts and, on the other hand, to deviations in the process parameters from specified set point values. For a flat transverse thickness profile of the final sheet to be achieved despite this, interventions are necessary at the die lip of the sheet die. These interventions are undertaken during the continuous operation of the machine and are essentially carried out in one of two ways, namely:

(1) Modifying the thickness profile by differently heating the die body of the sheet die, mainly in the vicinity of the die lip, as a result of which the melt viscosity is altered, under which circumstances a locally reduced viscosity results in a reduced frictional resistance and, consequently, in a higher material throughput of the plastic melt through the gap of the sheet die if the pressure drop is the same, and (2) Modifying the thickness profile by adjusting die bolts which generally interact with the upper die lip in order to alter the die gap width. The die bolts may, for example, be adjusted manually in order to exert pressure or tension on specified regions of one of the die lips. Instead of mechanically adjustable bolts, use is very often made of so-called thermobolts which adjust the die gap by thermally adjusting specified regions of one of the die lips. Electrical power is supplied to the thermobolts so that they expand more markedly or less markedly and thereby exert pressure or tension on the specified regions of the die lip.

As explained above, this adjustment is carried out either mechanically and manually by means of positioning motors or by means of thermobolts. In practice, it is found, however, that however precise the adjustment of the thickness profile, thick and thin points which can no longer be modified remain behind in the final sheet. This may make further processing of the final sheets difficult or even impossible. The ring-shaped beads which form in the sheet rolls impair the flatness of the unwound sheet web, with the result that faults may occur in further processing of the sheet web.

German Patent No. 3,006,566 discloses a method of smoothing out the sheet thickness of flat sheets produced in flat-sheet extrusion lines, in which method the current thickness of the film is measured in equally wide sheet sections, and correction sections of the sheet die from which these have been extruded are allocated to the sheet sections. In this method, the correction sections are exposed to different temperatures/heating powers in accordance with the measured thickness deviations of sheet sections from a thickness reference value, and specifically to an extent determined by the deviation from the thickness reference value in each case. Either the greatest thickness or the smallest thickness of one of the sheet sections is chosen as thickness reference value. If the sheet section exhibits a greater thickness exceeding the thickness reference value, cooling is carried out, i.e., the heating power is reduced whereas in the case of smaller thickness, heating is carried out, i.e., the heating power is increased.

European patent application EP-A 0,330,603 describes a device for extruding thermoplasticized plastics through a sheet die having a die gap which is determined by two flank faces of a die body, one of which is designed as a flexible die lip onto which a plurality of lever arms are molded. Each lever arm can be conveyed to a limited extent around an axis of rotation extending parallel to the die gap by an adjustment screw passing through the lever arm or by a similar mechanically constructed adjustment device in order to alter the gap width of the die gap.

In the method of producing a sheet of thermoplastic material with the aid of a sheet die described in German Patent No. 3,740,087, the controlling elements provided are so-called piezo translators which are controlled by control variables of a control device. In the event of a deviation of the actual value of the sheet thickness in a width section of the sheet die from a specified set point value, a suitable controlled variable is applied to the piezo translator allocated to the width section.

According to German Offenlegungsschrift DE-A 3,834,719, the die gap of a sheet die is adjusted by means of air-cooled and electrically heated thermobolts which carry a claw at one end and an adjustment screw at the other end. The claws embrace a bar-like die projection near the upper die lip of the sheet die and are linked to the die projection by means of detachable tapered pins. The adjustment screws of the thermobolts are screwed into a threaded block which is in turn screwed to a shoulder of the die body.

Common to the known methods and devices for extruding thermoplastic sheets is the fact that, however precise the adjustment of the thickness profile of the sheet preform, thick and thin points remain behind which make themselves felt even in the biaxially-stretched final sheet. These thick and thin points can no longer be smoothed out, even by biaxial-stretching.

OBJECT AND SUMMARY OF THE INVENTION

Consequently, the object of the present invention is to improve a method of the type described above in such a way that a smoothing-out of the sheet thickness of the sheet preform is obtained with extensive elimination of thick or thin points in the individual sheet sections.

In accordance with a particularly advantageous aspect of the invention, the method comprises measuring the thickness of the sheet at a plurality of points along the width of the sheet and choosing a number of equally-wide sheet sections which equals the number of the controlling elements and allocating adjustment sections for the upper lip to the sheet sections, the adjustment sections being situated around the controlling elements. Other steps include measuring the thickness of the sheet over the width of the sheet and averaging the thicknesses within the sections to obtain a measured thickness value for each of the sections, and measuring, in each of the sections, the difference between the measured thickness and a specified thickness. Subsequent steps include coarse smoothing the sheet by actuating the controlling elements to carry out a thickness control in the sections in accordance with the measured difference, then ascertaining the locations of remaining local thick and thin points in the sections, and then fine smoothing the sheet by subjecting the thick and thin points in each of the sections to controls which differ transversely across the sheet. Each of the controls comprise at least one of a temperature control and a heating power control.

Another object of the invention is to provide a device for smoothing out the thickness of a sheet of thermoplastic material which is extruded through a sheet die having upper and lower lips and an integrated shoulder having a threaded block provided thereon.

In accordance with a preferred aspect of the invention, the device comprises controlling elements which are connected to one of the opposed lips and which coarse smooth the sheet. The controlling elements include bolts and adjustment screws connecting the upper ends of the bolts to the shoulder of the sheet die. The device further comprises a heating device which extends transversely of the sheet die and which directly contacts one of the lips. The heating device includes 1) a transversely displaceable bar and 2) electrically heated plates arranged on the bar.

In accordance with another aspect of the invention, the heating device further comprises a prismatic hollow box which is formed integral with one of the die lips, which extends laterally across the sheet, and which has lateral endfaces. The bar passes through the box and has opposed ends which project through the lateral endfaces of the box. The interfaces between the bar and the endfaces of the box are sealed against a liquid in the box, and an internal sealed gap is formed between the bar and the box and is filled with a liquid which improves heat transfer between the plates between the box and the die lip on which the box is integrated.

In accordance with another aspect of the invention, a motor selectively positions the bar, in accordance with an averaged thickness profile of the sheet, such that the plates are aligned with thin and thick points on the sheet. A process computer determines the thickness profile of the sheet over the width of the sheet. The computer averages the thickness profile in at least two stages for a specified number of sheet sections. The motor is a computer-controlled motor which receives signals from the process computer.

The invention achieves the advantage that it is possible to calculate from a measurement of the thickness profile of the sheet preform what the optimum transverse adjustment of the heating device of the sheet die is in order to smooth thick or thin points which cannot be smoothed by the conventional control of the gap width of the sheet die, it being possible to move the bar of the heating device in a simple way on the basis of the measured thickness profile, with the gap width being controlled in the specified position by suitable heating power in the conventional manner.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention is explained in greater detail below with reference to the drawings. In these.

DETAILED DESCRIPTION OF THE PREFERRED EMBODIMENTS

The above-stated as well as other objects are achieved by a method which comprises choosing the number of equally wide sheet sections to be equal to the number of controlling elements for the adjustable upper lip of the sheet die and allocating adjustment sections of the upper lip situated around the controlling elements to the sheet sections, carrying out the thickness control in the equally wide sheet sections in accordance with the measured thickness deviations of the sheet sections from a specified thickness value by means of the controlling elements to achieve a coarse smoothing, and additionally exposing the remaining local thick and/or thin points in the sheet sections to different temperatures/heating powers transversely across the sheet web to achieve fine smoothing of the sheet.

In an extension of the method, the thick and/or thin points of the sheet web are exposed to different temperatures/heating powers with the aid of a heating device progressively moved transversely with respect to the sheet web, and the coarse smoothing is carried out by the controlling elements and the temperature exposure for the fine smoothing by the heating device from die lips situated opposite each other.

In a further development of the method, the local thick and/or thin points in the sheet sections are exposed to different temperatures/heating powers of the heating device moved transversely with respect to the sheet web from the same die lip at which the coarse smoothing is carried out by means of the controlling elements.

A device comprises a heating device for smoothing out the thickness of a sheet of thermoplastic material which is extruded through a sheet die having a die body provided with bolts near the upper die lip which interact as controlling elements, the upper ends of the bolts being linked by means of adjustment screws to a threaded block of an adjustment device integrated with the sheet die. The heating device is arranged transversely with respect to the sheet web, has direct contact with one of the die lips, and has a transversely displaceable bar on which small hot plates are arranged which are electrically heated.

In a development of the device, the heating device has a prismatic hollow box through which the movable bar passes. The bar has ends which project laterally at the endfaces of the hollow box. The hollow box is integrated with the upper or lower die lip.

Figure 1:
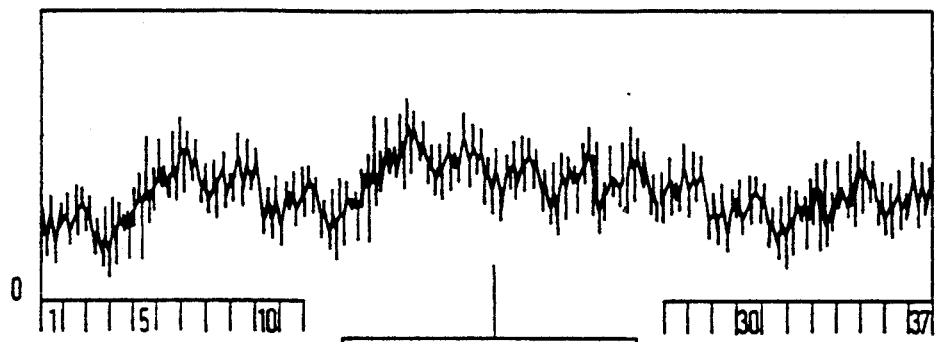
FIG. 1 shows a thickness profile of a biaxially-stretched sheet measured continuously over the width.

FIG. 1 shows by way of example a thickness profile of a biaxially-stretched final sheet measured continuously over the width. In this profile, very many individual thickness values, namely more than 1,000, are measured over the width. At the die lip of the sheet die, from which the sheet preform which subsequently becomes the final sheet by biaxial stretching, is extruded, it is only possible to adjust as many values as there are controlling elements available for the movable die lip. In a practical embodiment, for example, 36 to 40 controlling elements are provided for the upper die lip of a sheet die, the die gap of which has a width of about 1 m. These relatively few adjustment possibilities for the die gap of the sheet die make it necessary for the continuously measured thickness values to be condensed to a number which corresponds to the number of adjustment possibilities for the upper die lip, i.e., it is necessary, for example, for an averaging to a total of 37 sheet sections to be carried out if 37 controlling elements are present which extend adjacently to one another over the width of the sheet preform. With a sheet width of the sheet preform of 1 m and with 37 controlling elements, this means that the individual sheet section is around 2.5 cm wide.

Figure 2:
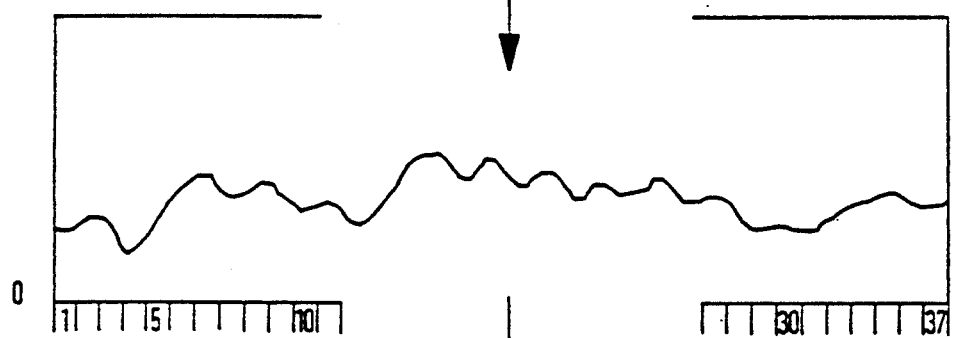
FIG. 2 shows a thickness profile of the biaxially stretched sheet averaged over a specified number of values derived from the measured thickness profile of FIG. 1.

In this averaging of the measured thickness profile, a two-stage condensation process is carried out. FIG. 2 shows the first stage of the condensation process, in accordance with which a thickness profile is derived from, for example, 540 measured thickness values. This averaged thickness profile is made use of for the visual evaluation of the biaxially-stretched final sheet.

Figure 3:
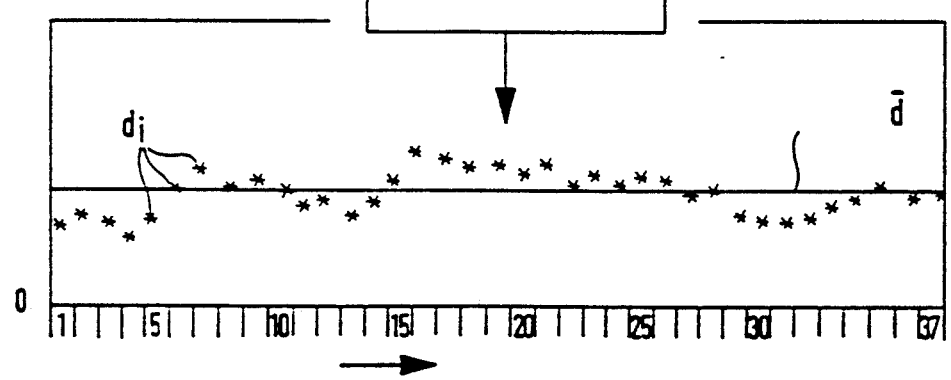
FIG. 3 shows a condensed control profile for the thickness of the biaxially stretched sheet in a specified number of sheet sections derived from the averaged thickness profile of FIG. 2.

FIG. 3 shows a control profile, condensed from the averaged thickness profile of FIG. 2, for the thickness of the final sheet in the specified number of 37 sheet sections in accordance with the practical exemplary embodiment cited. A controlling element for adjusting the movable upper die lip of the sheet die is allocated to each of said 37 sheet sections.

Figure 5:
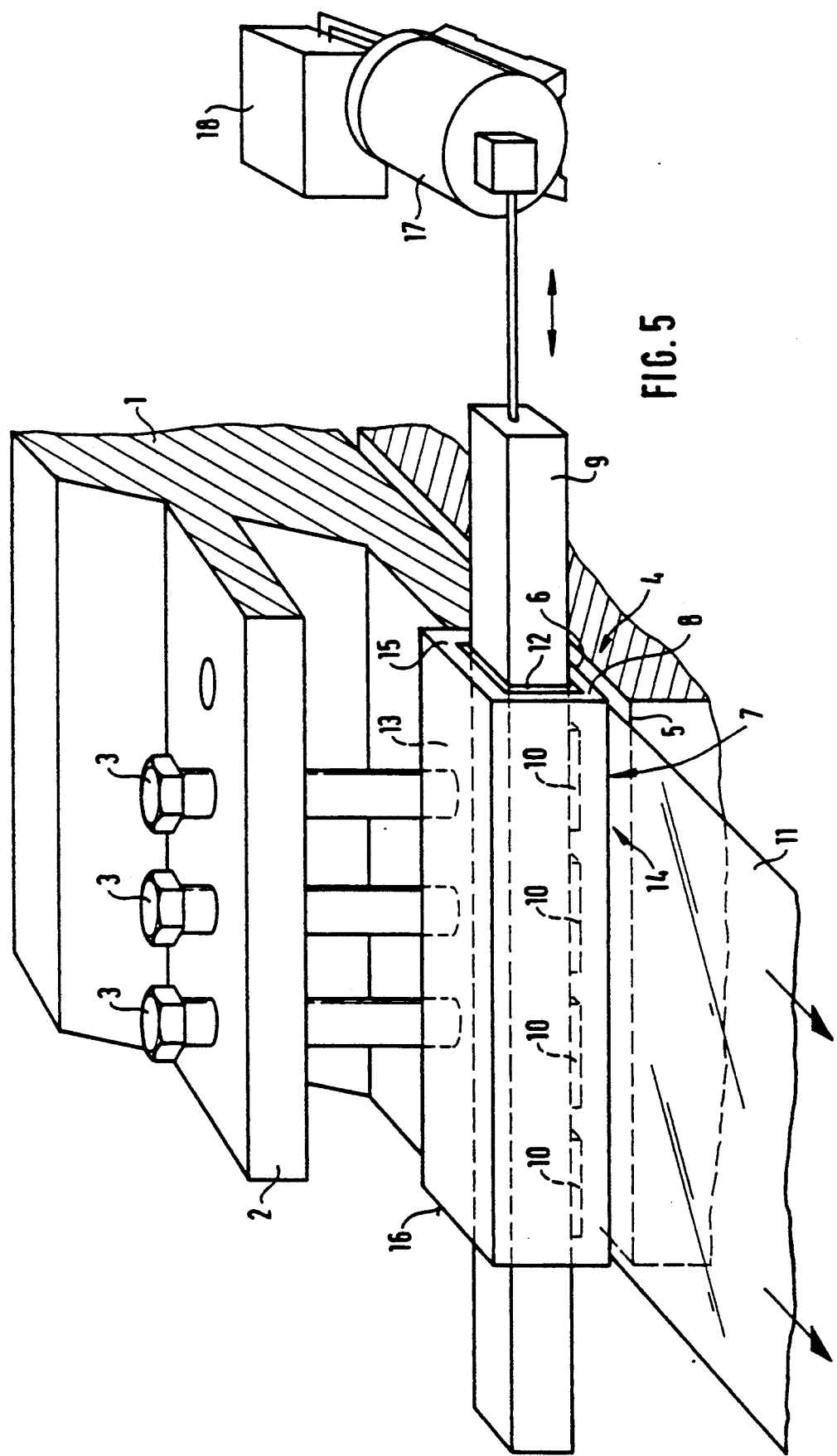
FIG. 5 shows a diagrammatic perspective view of a first embodiment of the device according to the invention.
Figure 6:
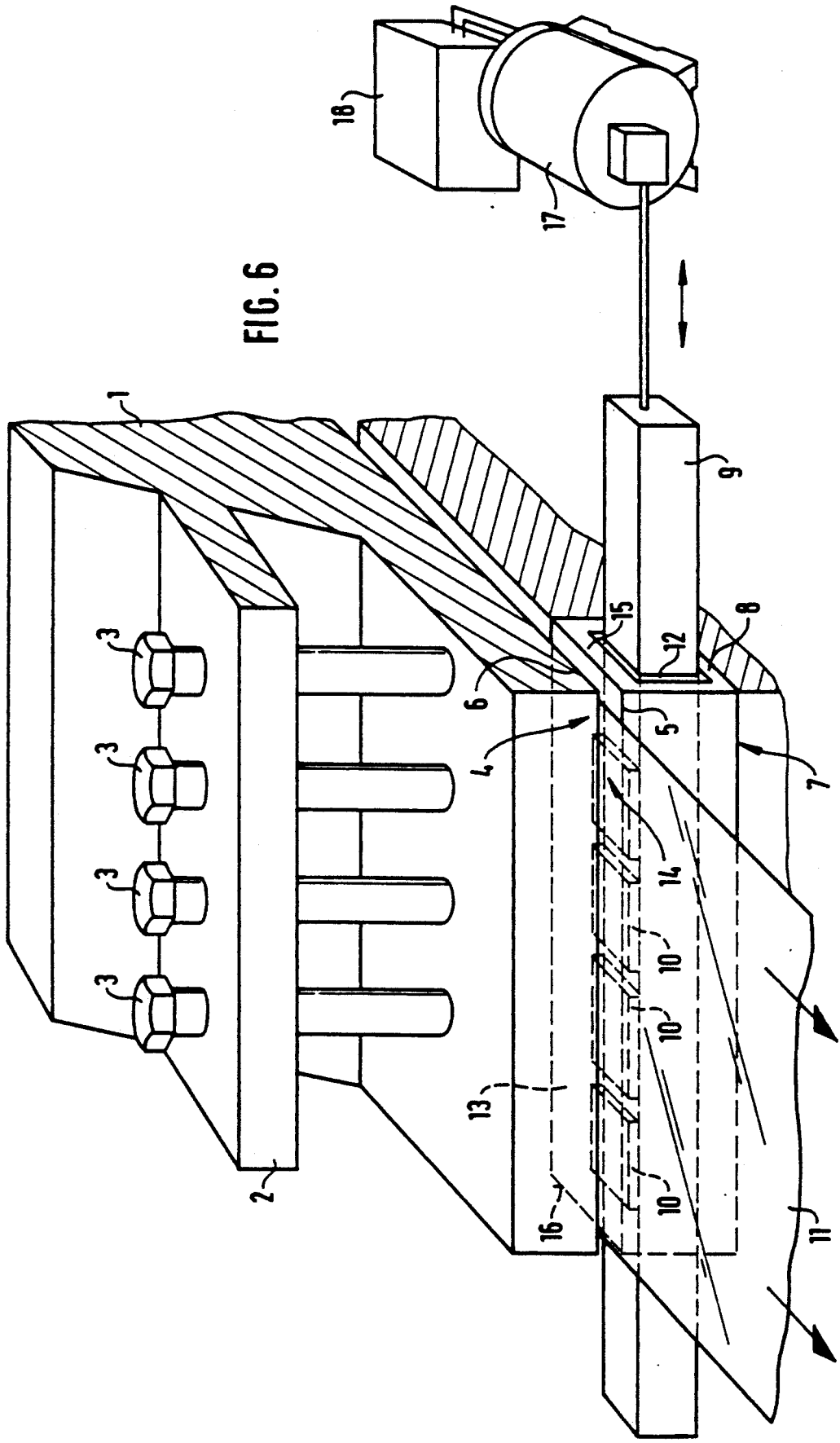
FIG. 6 shows a diagrammatic perspective view of a second embodiment of the device according to the invention.
Figure 7:
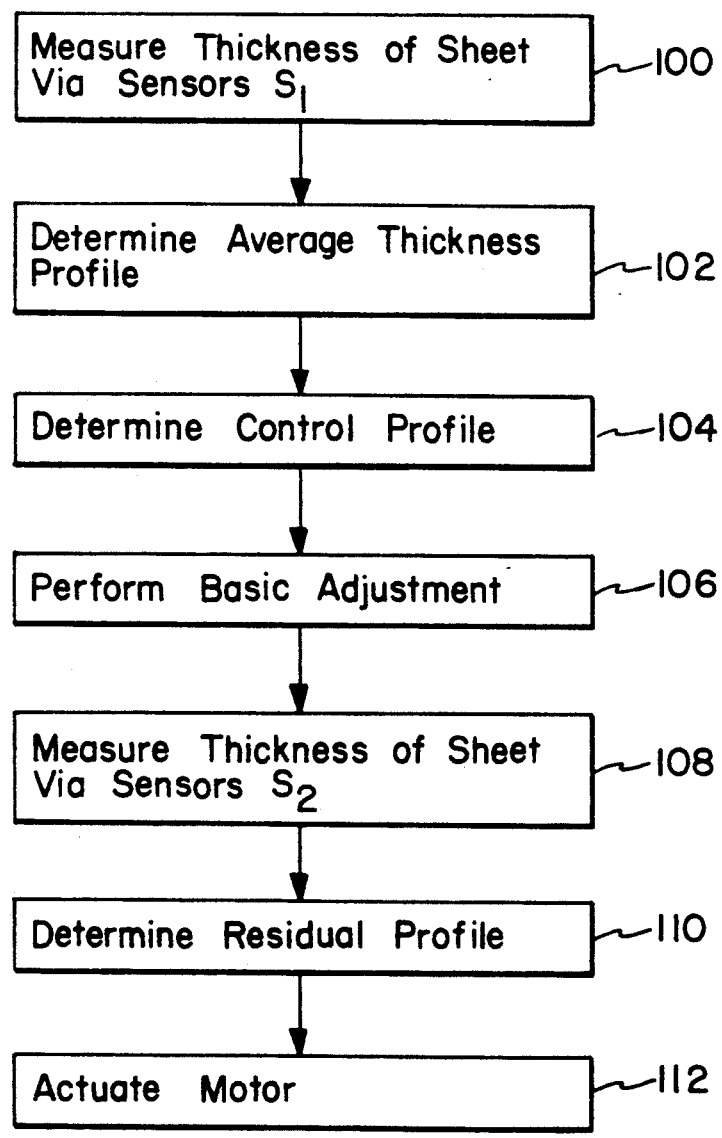
FIG. 7 is a flow chart illustrating the control of the device according to the invention.

The operations described by reference to FIGS. 1 to 3, such as smoothing the measured thickness profile and two-stage condensation of the thickness profile to produce the control profile comprising 37 thickness values are carried out by means of a process computer 18 (FIGS. 5-7). In these smoothing and averaging operations, the fact that a condensation to only 37 control values from more than 1,000 measured values of the sheet thickness is carried out always has to be borne in mind.

As can be inferred from FIGS. 1 to 3, both thick and thin points which each deviate upwards or downwards from an average thickness are produced in the thickness profile of the final sheet. The difference between the thick points and the average thickness and between the average thickness and the thin points provides, for example, control signals for the controlling elements and/or a heating device which exposes the upper die lip to appropriately different heating powers at the points at which thick and/or thin points occur.

The control generally functions so well that, at least as a time average, the representative thicknesses in the individual sheet sections are equally large, i.e., the sheet sections have the same mean thickness, for a local smoothing or averaging over a plurality of traverses of the sheet. However, it would be erroneous to draw the conclusion from this that the thickness profile of the sheet is absolutely flat. It is much more the case that a so-called residual profile is present in the regions of the sheet sections and this is shown diagrammatically in FIG. 4. Although the average values of each sheet section are constant, the thickness profile in these sheet sections is not flat, but on the contrary, the unduly thick and unduly thin regions of the sheet sections cancel one another out in the thickness measurement across the individual sheet section. The residual profile is situated between the controlling elements and cannot be affected by them. The thick/thin points of the residual profile are locally fixed, i.e., are also permanent with regard to time, as a result of which they produce winding problems in winding the final sheet since ring-shaped beads form in the sheet rolls during winding as a consequence of the thick points and these then impair the flatness of the unwound sheet web.

Figure 4:
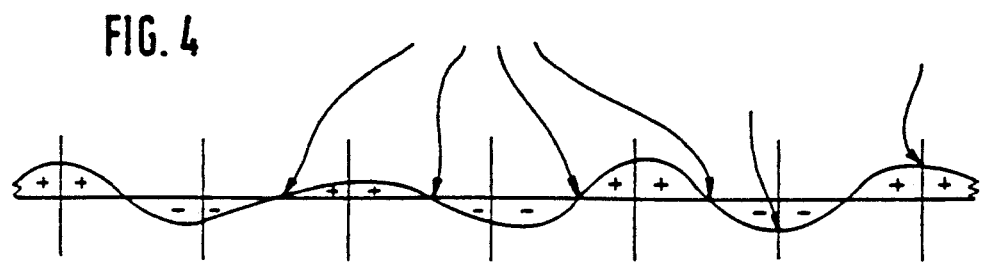
FIG. 4 shows a so-called residual profile in the regions of the sheet sections which are transversely displaced with respect to the controlling elements for controlling the sheet thickness.

In the residual profile shown in FIG. 4, the positions of the controlling elements are indicated by corresponding arrows, and it can be seen that, in these positions, the thickness profile intersects the horizontal line representing a specified average thickness. As already mentioned above, this is tantamount to the fact that the average values of each sheet section are constant, i.e., equal to the specified average thickness of the sheet. The thick and/or thin points of the thickness profile displaced transversely with respect to the positions of the controlling elements are marked by vertical lines in FIG. 4.

To smooth out the thick and/or thin points of the thickness profile, a plurality of possibilities suggest themselves, including a system of controlling elements comprising very many narrow controlling elements. However, the following problems arise in this system. The number of controlling elements cannot be increased indefinitely because of their spatial extension. With the standard width of the controlling elements of about 25 mm, it is very difficult to find, for a given thick/thin point in the final sheet, the corresponding controlling element, by controlling of which the thick/thin point can be smoothed. An increase in the number of controlling elements makes the smoothing of the final sheet more difficult.

To smooth out the thickness profile of the final sheet, it is therefore necessary to find a possibility for being able to intervene at any desired point in the sheet or in a sheet section. As a solution for this problem, a heating device is provided which can be displaced laterally as a whole transversely with respect to the longitudinal direction of the sheet. The thick/thin points in the residual profile are determined from a measurement of the thickness profile with subsequent smoothing and averaging of the thickness profile for a specified number of sheet sections. Consequently, the optimum transverse adjustment of the heating device can be calculated from the measurement of the thickness profile in order to smooth the thick/thin points present in the residual profile. The heating device is then moved to this calculated transverse adjustment in order to then achieve a control of the thickness profile on the spot by means of different temperatures or heating powers, in which control the thick/thin points lying outside the control region of the controlling elements are smoothed.

The control of the thickness profile by the method according to the invention is put together, for example, in the following manner:

a) thickness and adjustment are carried out manually by means of the controlling elements, b) an automatic fine adjustment is carried out in the conventional manner with the aid of the controlling elements, which are, for example, thermobolts, c) a fine adjustment of the thickness profile is carried out automatically by means of a transversely movable heating device which is present in addition to the conventional controlling elements, or a) the basic adjustment is carried out manually with the aid of conventional controlling elements, b) the fine adjustment is carried out automatically by means of a transversely movable heating device.

In the latter case, the controlling elements are, for example, bolts which can be adjusted mechanically by means of screws and which control the die gap of a sheet die. Optionally, thermobolts may also be provided for this purpose. The fine adjustment and, consequently, the smoothing of the thickness profile of the sheet is carried out with the heating device which can be moved transversely with respect to the sheet and which can be adjusted transversely either with respect to the upper die lip or to the lower die lip. FIG. 5 shows in diagrammatic perspective view a first embodiment of a device for smoothing out the thickness of a sheet 11 of thermoplastic material which is extruded through a sheet die 4. The sheet or sheet preform 11 emerges from a die gap 14 which is bounded by a lower die lip 5 and an upper die lip 6. To control the height of the die gap 14 of the sheet die 4, controlling elements 3 are present whose upper ends interact by means of adjustment screws with a threaded block of a shoulder 2 which is integrated with the sheet die 4. The controlling elements 3 are either mechanically adjustable bolts or air-cooled and electrically heated thermobolts, such as are described, for example, in German Offenlegungsschrift DE-A 3,834,719. Such thermobolts have a claw at one end which embraces a bar-like die projection near the upper die lip of the sheet die and which is linked to the die projection by means of a detachable tapered pin. At the upper end, these thermobolts carry an adjustment screw which is screwed into a threaded block of the shoulder 2. In the case of mechanically adjustable bolts, the basic adjustment of the die gap 14 is carried out manually with the controlling elements 3 by screwing the adjustment screw into particular positions. If the controlling elements 3 are thermobolts, a fine adjustment of the die gap 14 is carried out automatically by exposing the individual thermobolts to different temperatures or heating powers. Arranged in the emergence direction of the sheet 11, downstream of the controlling elements 3, is a heating device 7 for finely adjusting or for smoothing the thick/thin points of the residual profile of the thickness of the final sheet. In this connection it should be noted that FIG. 5 does not show the final sheet, which is the biaxially stretched sheet which is produced by the stretching operation from the extruded sheet preform 11. The heating device is arranged transversely with respect to the sheet web and is in direct contact with the upper die lip 6. The heating device 7 comprises a prismatic hollow box 8 through which a movable bar 9 passes. The ends of the bar 9 project laterally at the endfaces 15 and 16 of the hollow box 8. Arranged on the bar 9, which can be displaced transversely with respect to the sheet 11, are small hot plates 10 on the underside which are electrically heated and which are exposed to different temperatures/heating powers in a manner which is per se known. The hollow box 8 is expediently integrated with the upper die lip 6.

The inlet and outlet openings of the bar 9 in the endfaces 15 and 16 of the hollow box 8 are sealed against liquid. The gap between the bar 9 and the hollow box 8 is filled with a liquid 13 as a heat transfer medium which has a very high boiling point of greater than 280° C. and which effects the heat transfer between the small hot plates 10 of the bar 9 and the upper die lip 6. The liquid used as a heat transfer medium is not under pressure so that the requirements imposed on the seals 12 of the inlet and outlet openings in the endfaces 15 and 16 are low in relation to pressure tightness, but not in relation to the thermal resistance. Suitable liquids are, inter alia, oils with high thermal stability composed of mixtures of isomeric dibenzyltoluenes or benzyltoluenes or from the group comprising the phenylmethylsilicone oils. Only oils having a very high boiling point, i.e., low volatility at the necessary temperatures of more than 280° C. and having an adequate thermal stability at these temperatures are consequently suitable as heat transfer media. The mixtures of isomeric dibenzyltoluenes or benzyltoluenes are, for example, oils having boiling points between 280° and 390° C., which are supplied by the HÜLS chemical works in Germany. Other suitable oils are phenylmethylsilicone oils supplied by Wacker-Chemie, Germany, which can be obtained under the designations AP 500 and AP 200, these being liquids as clear as water which have a very low volatility of not more than 1% at a temperature of 250° C.

The chosen spacing between the small hot plates 10 and the upper die lip 6 of the sheet die 4 is less than or equal to 1 mm in order that a good heat transfer between the small hot plates 10 and the upper die lip 6 or the sheet 11 is achieved in an extremely short time. At the same time, the small spacing keeps the lateral heat conduction in the liquid acting as heat transfer medium as low as possible.

The bar 9 of the heating device 7 is mechanically linked to a motor 17 which positions the bar in accordance with the measured average thickness profile of the sheet in such a way that the small hot plates 10 are aligned with the thick and/or thin points of the sheet. The motor 17 receives control signals from a process computer 18 which is connected to the metal and in which the thickness profile measured over the sheet width is averaged for a specified number of sheet sections in at least two stages, as described above by reference to FIGS. 2 and 3.

Specifically, the process computer 18 actuates the motor 17 via a process such as the one illustrated schematically in FIG. 7. First, as discussed above with reference to FIGS. 1-3, very many individual thicknesses are measured over the widths of sheet 11 via sensors $S_1$, not shown, in a step 100. Then, a two stage condensation process is carried out in steps 102 and 104, with an average thickness profile being calculated in step 102 and with a control profile being calculated in step 104 in accordance with the procedures discussed above in connection with FIGS. 1-3. The final profile is performed by a number of calculated sheet sections equal in number to the number of control elements 3. In step 106, basic adjustment of each section is performed either automatically or manually via the conventional controlling elements, leaving the residual profile having remaining thick and thin points illustrated in FIG. 4. In step 108, the thickness of sheet 11 is again sensed via sensors $S_2$, not shown, the locations of these thick and thin points are determined by determining the residual thickness profile in step 110. Finally, in step 112, the process computer 18 outputs control signals which actuate the motor 17 to transversely position the bar 9 so that the hot plates 10 are aligned with the thick or thin points on the sheet.

The specific processes for calculating the thickness profile and the residual profile and for positioning the bar 9 comprise simple mathematical operations which are easily understood by those skilled in the art. Accordingly, further description of these calculations will be omitted for the sake of conciseness.

The second embodiment, shown in FIG. 6, of the device according to the invention comprises the same components as the first embodiment shown in FIG. 5, with the sole difference that the heating device 7 is situated opposite the controlling elements 13, in other words, that the hollow box 8 of the heating device 7 is integrated with the lower die lip 5 of the sheet die 4 and that the small hot plates 10 face the die lip 5.

What is claimed is:

1. A device for smoothing out the thickness of a sheet of thermoplastic material which is extruded through a sheet die having upper and lower opposed lips and an integrated shoulder having a threaded block provided thereon, said device comprising:

(A) controlling elements which are connected to one of said opposed lips and which coarse smooth said sheet, said controlling elements comprising bolts and adjustment screws connecting the upper ends of said bolts to said shoulder of said sheet die; and
    (B) a heating device which extends transversely of said sheet die, which directly contacts one of said lips, and which includes
        1) a transversely displaceable bar;
        2) electrically heated plates arranged on said bar;
        3) a prismatic hollow box which is formed integral with one of said die lips, which extends laterally across said sheet, and which has lateral endfaces, and wherein said bar passes through said box and has opposed ends which project through said lateral endfaces of said box, wherein the interfaces between said bar and said endfaces of said box are sealed against a liquid in said box; and
        4) an internal sealed gap formed between said bar and said box, said gap being filled with a liquid which improves heat transfer within said box between said plates and the die lip on which said box is integrated.

2. The device as claimed in claim 1, wherein said liquid comprises an oil which has high thermostability and which has a boiling point of greater than 280° C.

3. The device as claimed in claim 2, wherein said liquid is unpressurized and is comprised of a mixture of compounds selected from one or more of benzyltoluenes and phenylmethylsilicone oils.

4. The device as claimed in claim 1, wherein the spacing between said plates and the die lip into which said box is integrated is no greater than 1 mm.

5. The device as claimed in claim 1, further comprising a motor which selectively positions said bar, in accordance with an averaged thickness profile of the sheet, such that said plates are aligned with thin and thick points on said sheet.

6. The device as claimed in claim 5, further comprising a process computer in which the thickness profile of said sheet is determined over the width of said sheet, said computer averaging said thickness profile in at least two stages for a specified number of sheet sections, wherein said motor is a computer-controlled motor which receives signals from said process computer.

7. The device as claimed in claim 1, wherein said heating device is disposed on said upper lip.

* * * * *